United States Patent [19]

Norman

[11] 4,396,591
[45] Aug. 2, 1983

[54] RECOVERY OF HYDROGEN IODIDE

[75] Inventor: John H. Norman, La Jolla, Calif.

[73] Assignee: GA Technologies Inc., San Diego, Calif.

[21] Appl. No.: 379,363

[22] Filed: May 18, 1982

[51] Int. Cl.$^3$ .......................... C01B 7/00; C01B 3/02; C01B 11/00; C01B 11/04

[52] U.S. Cl. ...................................... 423/462; 23/298; 23/43; 23/481; 23/488; 23/501; 23/648 R

[58] Field of Search .................... 423/648 R, 462, 481, 423/488, 501, 500; 23/293 R; 210/754; 203/50, 24, 12, 43

[56] References Cited

U.S. PATENT DOCUMENTS

| | | | |
|---|---|---|---|
| 3,044,862 | 7/1962 | Paul ...................................... | 423/500 |
| 3,761,579 | 9/1973 | Curtis, Jr. et al. .................. | 423/481 |
| 4,089,939 | 5/1978 | Norman et al. .................. | 423/648 R |
| 4,089,940 | 5/1978 | Norman et al. .................. | 423/648 R |
| 4,127,644 | 11/1978 | Norman et al. .................. | 423/648 R |
| 4,176,169 | 11/1979 | Mysels ................................. | 423/488 |
| 4,258,026 | 3/1981 | O'Keefe et al. .................. | 423/648 R |
| 4,314,982 | 2/1982 | Norman et al. ...................... | 423/540 |
| 4,330,374 | 5/1982 | O'Keefe et al. ...................... | 203/12 |

Primary Examiner—O. R. Vertiz
Assistant Examiner—Jackson Leeds
Attorney, Agent, or Firm—Fitch, Even, Tabin, Flannery & Welsh

[57] ABSTRACT

A method of extraction of HI from an aqueous solution of HI and $I_2$. HBr is added to create a two-phase liquid mixture wherein a dry phase consists essentially of HBr, I and HI and is in equilibrium with a wet phase having a far greater HBr:HI ratio. Using a countercurrent extractor, two solutions can be obtained: a dry HBr—HI—$I_2$ solution and a wet essentially HBr solution. The dry and wet phases are easily separable, and HI is recovered from the dry phase, after first separating $I_2$, as by distillation. Alternatively, the HI-HBr liquid mixture is treated to catalytically decompose the HI. HBr is recovered from the wet phase by suitable treatment, including high-pressure distillation, to produce an $H_2O$—HBr azeotrope that is not more than 25 mole percent HBr. The azeotrope may be returned for use in an earlier step in the overall process which results in the production of the aqueous solution of HI and $I_2$ without major detriment because of the presence of HBr.

13 Claims, 1 Drawing Figure

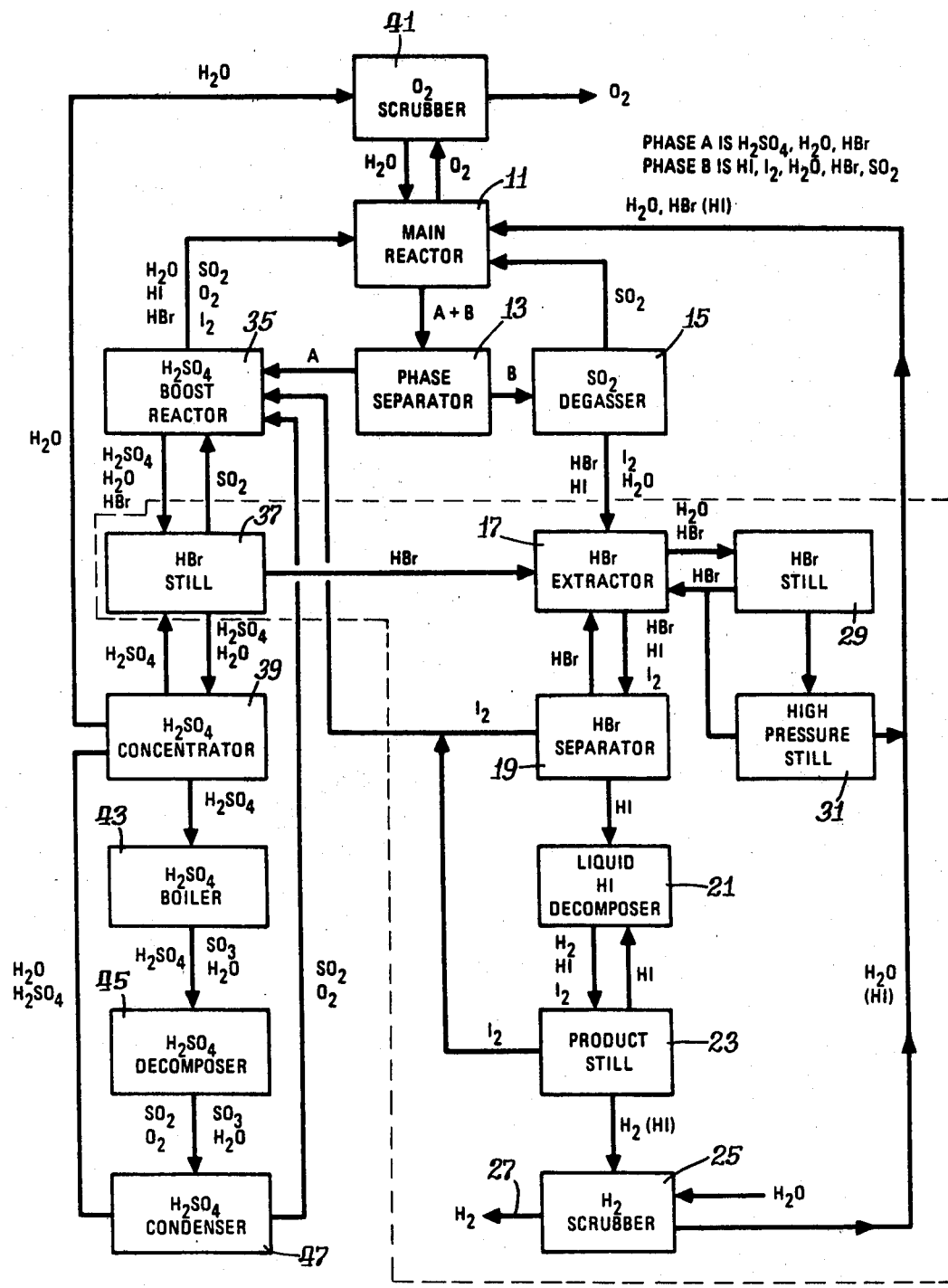

RECOVERY OF HYDROGEN IODIDE

The government has rights in this invention pursuant to Contract Number DE-AC02-80ET26225 awarded by the U.S. Department of Energy.

This invention to relates to recovery of hydrogen iodide from aqueous solutions and more particularly to the recovery of hydrogen iodide from a solution of hydrogen iodide, water and iodine.

BACKGROUND OF THE INVENTION

A process for producing hydrogen from water has been developed using the sulfur-iodine cycle, sometimes termed a water-splitting process, which utilizes the Bunsen reaction. The process is disclosed in detail in U.S. Pat. No. 4,089,940, which issued on May 16, 1978 to John H. Norman et al., and reacts water, $SO_2$ and $I_2$ under conditions which create two liquid phases—an aqueous phase containing the $H_2SO_4$ product and a relatively dry phase containing the major portion of the HI product plus iodine and some water. There has been some difficulty in obtaining a relatively dry HI product because HI and $H_2O$ form an azeotrope. Phosphoric acid has been used to break this azeotrope, as set forth in U.S. Pat. No. 4,127,644, issued Nov. 28, 1978 to John H. Norman et al. Extractive distillation is a somewhat energy-intensive processing step, and the reconcentration of the phosphoric acid is a particularly energy-intensive step.

A further improvement was made with respect to recovery of hydrogen iodide which utilized the high-pressure creation of two separate liquid phases when compositions within certain precentage ranges of HI, $I_2$ and $H_2O$ were present, which process is described in detail in co-pending U.S. application Ser. No. 073,566, filed Sept. 7, 1979 in the names of Dennis R. O'Keefe et al. However, effective use of such process generally requires some $H_3PO_4$ treatment or the like in order to increase the HI percentages within the composition, again requiring the relatively energy-intensive recovery of the phosphoric acid. Accordingly, the search continued for still less energy-intensive methods for recovering hydrogen iodide.

SUMMARY OF THE INVENTION

A method has been devised for using HBr to create a solvent extraction process via the formation of two liquid phases. A dry phase contains HBr, $I_2$ (if present) and HI, and a wet phase contains HBr and $H_2O$. After separation of the two phases, HI is obtained in a utilizable form from the dry phase, or HI can be thermally decomposed in the presence of HBr following separation of $I_2$ therefrom. A portion of the HBr is recovered and recycled using a high-pressure azeotrope-shifting step, and another portion may be recycled along with $H_2O$ to the Bunsen reaction—assumming it is being used to create the initial solution being treated.

BRIEF DESCRIPTION OF THE DRAWINGS

The FIGURE is a schematic illustration of a system for carrying out an overall water-splitting process with the portion encompassed within the broken lines generally showing the present improvement, recognizing that HI liquid decomposition was earlier known.

DETAILED DESCRIPTION OF THE PREFERRED EMBODIMENT

It has been found that HBr extraction of HI from an aqueous solution of HI (which may also include $I_2$) is feasible because the relative distribution coefficient is quite high with respect to HI, i.e., about 5. The relative distribution coefficient is defined in terms of the mole fractions of the hydrogen halides in the two liquid phases as follows:

$$D = \frac{HI_{dry} \cdot HBr_{wet}}{HI_{wet} \cdot HBr_{dry}}$$

Therefore, the addition of sufficient HBr to create such a two-phase liquid system makes countercurrent extraction of the HI from the solution feasible. In fact, it has been found that about one mole of HI in the product solution from the Bunsen reaction can be extracted by about 2.4 moles of HBr and that substantially all of the HI present can be extracted in a multistage countercurrent extractor.

Following extraction, the dry HI—HBr phase permits relatively straightforward distillation of HBr therefrom at a bottoms temperature in the range of about 300° C. to 400° C. at about 40 atmospheres. Alternatively, it is possible to directly decompose the HI as a part of a liquid decomposition process in the presence of the HBr. The catalytic decomposition of liquid hydrogen iodide is disclosed in detail in U.S. Pat. No. 4,258,026, which issued on Mar. 24, 1981 to Dennis R. O'Keefe et al., the disclosure of which is incorporated herein by reference.

The invention is illustrated in the FIGURE as part of an overall water-splitting process for creating hydrogen and oxygen from water, which is based upon the Bunsen reaction. Details of the individual steps are set forth in the aforementioned U.S. Patents and accordingly are not repeated hereinafter, except that broad reference is made to the steps sufficient to understand the application of the present invention thereto. It should be understood that the invention is also applicable to recovering HI from an aqueous solution thereof which is substantially iodine-free.

Briefly, a main reactor 11 is provided wherein the chemical reaction of $H_2O$, $I_2$ and $SO_2$ is carried out to form $H_2SO_4$ and HI in accordance with the Bunsen reaction under conditions such that two liquid phases are created. The heavier of the two phases, sometimes referred to hereinafter as the first phase, is the hydrogen iodide-bearing phase, whereas the second phase is the lighter or less dense of the two phases and is the $H_2SO_4$-bearing phase. In the FIGURE, the lighter phase is referred to as phase A and the heavier phase as phase B. The two-phase mixture exits from the main reactor and enters a phase separator 13 wherein the separation of the two phases occurs.

The heavier phase B is preferably passed first to a stripper 15 where excess sulfur dioxide is removed by subjection to a vacuum or inert gas stripping. Mild heating may be used to increase its vapor pressure. The sulfur dioxide is returned to the main reactor 11, and the resultant, degassed stream is conducted to an HBr extractor 17.

The extractor 17 is preferably operated as a countercurrent extractor with the degassed phase B entering the top and the HBr being supplied at one or more lower locations. As soon as the capacity of the phase B to dissolve HBr is satisfied, two distinct liquid phases are created, which are hereinafter termed a wet phase and a dry phase and which change in composition as they transit the multistage column as extraction proceeds. The operation of the extractor 17 is such that at least a major portion of the HI in the incoming phase B is extracted into the HBr dry phase, and accordingly at least a major portion of the $H_2O$ remains in the wet phase.

The wet phase, depending on temperature, is the more dense of the two and upon exiting consists essentially of $H_2O$ and HBr; it preferably contains substantially all of the original water and about 2 moles of HBr for every mole of HI that was initially present in phase B not accounting for initially present HBr. Sufficient HBr is preferably added in the extraction to remove substantially all of the HI from the aqueous incoming phase B so that the less dense dry phase, when it exits the top of the extractor, contains HBr, substantially all of the HI, $I_2$ and less than about 1 weight % $H_2O$. The creation of these wet and dry phases is relatively temperature-insensitive, and it is considered feasible to operate the HBr extractor at a suitable temperature as low as about 0° C. and up to a temperature of about 90° C. for the HBr inlet stream and about 130° C. for the heavy phase B inlet stream. Because of this relative temperature insensitivity, it may be preferred to operate the HBr extractor 17 at a temperature which is determined by the remainder of the system, namely the temperature of the main reactor or of the $SO_2$ stripper 15, and in this respect operation may be at about 100° C. However, it may also be preferred to have nearly all of the $I_2$ exit in the dry phase, and this end may be achieved in some instances by operating at a slightly higher temperature, e.g. 115° to 120° C.

The dry phase exiting from the top of the extractor 17 may contain, for example, about 70 mole % HI and about 30 mole % HBr, calculated on an $H_2O$- and $I_2$-free basis and is routed to an HBr separator 19 where a three-way separation is effected. The separator is operated essentially in two steps to first remove the iodine by boiling off the HBr and HI, and then the HBr and HI are separated by a condensation step. The separator is operated to boil off HI and HBr at a bottoms temperature of between about 300° C. and 400° C. and an appropriate pressure, e.g. about 40 atmospheres. The HBr is returned to the extractor 17, and the HI is routed to a liquid HI decomposition reactor 21.

The decomposition of the liquid HI is carried out in accordance with the teaching of aforementioned U.S. Pat. No. 4,258,026, operating at temperatures up to about 150° C. and using a suitable platinum group metal catalyst. The stream exiting from the decomposition reactor 21 contains product $H_2$ and $I_2$ and undecomposed HI and is routed to a still 23. Alternatively, it is considered feasible to operate the separator 19 so as to only remove the $I_2$ and not effect a separation of HBr and HI, allowing both of these hydrogen halides to flow to the liquid HI decomposer. The liquid HI decomposition reaction can take place in the presence of substantial amounts of HBr without severely affecting either the catalyst or the reaction rate, and accordingly, it is considered feasible to treat the dry HI-HBr phase to carry out the decomposition before recovering the HBr and returning it to the HBr extractor 17. Moreover, it may not be absolutely necessary to separate the $I_2$ before decomposing the HI; however, the presence of $I_2$ would tend to lower the driving force of the decomposition reaction.

In the process shown in the FIGURE, the still 23 is operated at a bottoms temperature of about 440° C. and a pressure of about 50 atm. Gaseous $H_2$, with an equilibrium partial pressure of HI, comes off the top of the still, whereas liquid HI is recovered from an intermediate location and the iodine is recovered from the bottom. The HI is returned to the liquid HI decomposition reactor 21.

The gaseous hydrogen stream is routed to a scrubber 25 where a minimal amount of water is used to remove the residual HI to produce a clean hydrogen product stream 27. The scrubbing liquid with the HI is returned to the main reactor 11.

The wet phase exits from the bottom of the countercurrent extractor 17 is routed to an HBr still 29. The HBr—$H_2O$ solution from the countercurrent extractor 17 is highly superazeotropic in HBr, and much of the HBr can be distilled from this mixture without a large energy expenditure. For example, the HBr still 29 may be operated at a bottoms temperature of about 125° C. and atmospheric pressure. At these conditions, the azeotrope is about 17 mole percent HBr and 83 mole percent $H_2O$, which is to be compared with an incoming wet phase containing about 40 mole percent HBr. The HBr leaving the still 29 is condensed and returned to the HBr extractor 17.

It has been found that the HBr—$H_2O$ azeotrope, which is about 17 mole percent HBr at one atmosphere, changes to only about 7 mole percent HBr when the pressure is increased to about 200 atmospheres. Accordingly, the azeotrope from the low-pressure still 29 is routed to a high-pressure still 31 which is operated at about 200 atmospheres and a temperature of about 395° C. Accordingly, additional HBr is distilled from the solution, and it is also condensed and returned to the HBr extractor 17. It has further been found that the remaining azeotrope, which is about 7 mole percent HBr and 83 mole percent $H_2O$, can be returned to the main reactor 11 and utilized directly therein because the presence of the HBr is only slightly detrimental to the basic Bunsen reaction which is occurring therein. Utilization of the azeotrope in this manner is extremely advantageous inasmuch as a further highly energy-intensive extractive distillation of water is avoided. Generally, it is felt that the high-pressure still 31 should be operated at a pressure between about 150 and about 225 atmospheres and a corresponding temperature in order to take good advantage of the shifting of the azeotrope to not more than about 8 mole % HBr. The returned HBr from the azeotrope is distributed in both liquid phases created in the main reactor 11. The HBr content of the heavier phase B simply adds to the total amount of HBr in the extractor 17.

The aqueous phase A from the phase separator 13 is routed first to an $H_2SO_4$ boost reactor 35 where it is mixed with the iodine streams recovered from the HBr separator 19 and the product still 23 and with additional recovered $SO_2$, while it is maintained at essentially the same temperature and pressure as the main reactor 11. As a result, the Bunsen reaction proceeds further to the right producing additional $H_2SO_4$. The $H_2SO_4$ concentration, for example, can be boosted or increased from a concentration of about 50 percent to about 57 percent by creating additional $H_2SO_4$ from the $H_2O$ present in the aqueous phase A. The concept of the boost reactor is to provide sufficient liquid iodine to constitute a separate liquid iodine phase which will be in equilibrium with the aqueous phase A and to saturate the liquid in the reactor 35 with $SO_2$. The liquid $I_2$ phase contributes $I_2$ to the reaction and also extracts the HI produced by the reaction from the aqueous phase. In addition, it extracts a significant amount of water which is also advantageous in requiring less water to be removed in a subsequent step. The output from the boost reactor 35 is a gaseous stream containing primarily $O_2$ and $SO_2$ with other vapors present at their equilibrium partial pressures, the liquid $I_2$ phase and the aqueous phase. The liquid $I_2$ phase, which carries substantially all of the HI, some water and some HBr, is routed along with the gaseous stream back to the main reactor 11. The aqueous phase is directed to an HBr still 37.

The HBr still 37 is operated at a bottoms temperature of about 170° C. and a pressure of about 2 atm. to distill an overhead stream of HBr and $SO_2$. Sufficient concentrated $H_2SO_4$ is added to the still 37 from a later step to break the $H_2O$—HBr azeotrope. The HBr may be condensed from the stream in the absence of $H_2O$ and returned to the HBr extractor 17. The separated $SO_2$ is bubbled into the liquid in the boost reactor 35 and helps provide the desired $SO_2$ saturation therein. The bottoms from the HBr still consist essentially of water and $H_2SO_4$ and proceed to a concentrator 39.

The concentrator 39 may be operated at a temperature of about 360° C. and a pressure of about 2 atm. to evaporate the water and separate a bottom stream of fairly dry $H_2SO_4$. The water is condensed and routed to an oxygen scrubber 41 which is employed to remove residual vapors, i.e., $SO_2$ and others, in the gaseous stream exiting overhead from the main reactor 11 to create a substantially pure oxygen stream. The origin of the oxygen is described hereinafter.

The dry $H_2SO_4$ is routed to a boiler 43 where it is vaporized at a temperature of at least about 335° C. (1 atm.), resulting in some breakdown to $H_2O$ and $SO_3$. The vapor stream from the boiler 43 is directed to an $H_2SO_4$ catalytic decomposer 45. The decomposition reaction may be carried out in accordance with the teaching of U.S. Pat. No. 4,314,982, issued Feb. 9, 1982 to John H. Norman et al. The vapor stream exiting from the decomposer 45 is immediately delivered to a condenser 47. The gaseous $SO_2$ and $O_2$ stream from the condenser 47 is returned to the boost reactor 35 where the $SO_2$ contributes to the desired $SO_2$ saturation therewithin. The oxygen eventually finds its way to the main reactor and then to the scrubber 41. The condensate stream from the condenser 47 is recycled to the concentrator 39.

The present invention is considered to provide a substantial improvement over earlier methods of providing dry hydrogen iodide utilizing extractive distillation with $H_3PO_4$ or the like, because such operations were energy-intensive from the standpoint that all of the water had to eventually be distilled from the $H_3PO_4$. In accordance with the present invention, the HBr treatment allows the creation of a dry HI composition from an aqueous solution of HI (which may contain other components such as $I_2$) wherein the necessity for boiling water is very substantially reduced in favor of the less energy-intensive evaporation of HBr, which is a gas at ambient conditions.

Although the invention has been described with respect to certain preferred embodiments, it should be understood that changes and modifications as would be obvious to one having the ordinary skill in the art may be made without departing from the scope of the invention which is defined by the claims appended hereto. For example, the $H_2SO_4$ boost reactor 35 may be operated as a countercurrent extractor with the $I_2$ stream flowing countercurrent to phase A under conditions so that substantially all of the HBr is extracted into the iodine phase and thus returned to the main reactor 11; and in such an instance, it would be possible to eliminate the HBr still 37 and allow any residual HBr in the aqueous phase to be returned to the main reactor with the water from the $H_2SO_4$ concentrator 39 via the $O_2$ scrubber 41.

Particular features of the invention are emphasized in the claims which follow.

What is claimed is:

1. A method for extracting HI from a solution containing HI and $H_2O$, which method comprises the steps of
    adding HBr to create two liquid phases:
    a dry phase containing HBr and a major portion of the HI from said solution and a wet phase containing a major portion of the $H_2O$ from said solution and HBr, and
    separating said wet and dry phases to obtain HI in a utilizable form.

2. A method in accordance with claim 1 wherein said dry phase contains substantially all of the HI from said solution and after said separating step is treated to distill HI therefrom.

3. A method in accordance with claim 1 wherein said solution also contains $I_2$ which is carried into said dry phase and said dry phase is treated to separate $I_2$ therefrom leaving a liquid mixture of HI and HBr.

4. A method in accordance with claim 3 wherein said liquid mixture is subjected to catalytic decomposition to decompose HI and form $H_2$ and $I_2$.

5. A method in accordance with claim 1 wherein said HBr addition to said solution is carried out as a countercurrent extraction step.

6. A method in accordance with claim 1 wherein said wet phase contains substantially all of the $H_2O$ from said solution and is subjected to high-pressure distillation to distill HBr therefrom for recovery and reuse and create an HBr—$H_2O$ azeotrope containing not more than about 8 mole percent HBr.

7. A method in accordance with claim 6 wherein said high-pressure distillation is carried out at a pressure of at least about 200 atm. and a temperature of at least about 395° C.

8. In a process for the production of $H_2$ from $H_2O$ using the Bunsen reaction including the steps of
    reacting $H_2O$, $I_2$ and $SO_2$ in a main reaction step under conditions which create first and second distinct liquid phases,
    separating said first phase containing HI, $I_2$, $H_2O$ and $SO_2$ from said second phase,
    removing $SO_2$ from said first phase, and
    recovering HI from said first phase and decomposing same to create $H_2$,
    the improvement which comprises
    adding sufficient HBr to said first phase to again create two liquid phases: a dry phase containing HBr, $I_2$ and substantially all of the HI and a wet phase containing substantially all of the $H_2O$ and HBr and
    separating said dry phase from said wet phase to obtain HI in a form for said decomposing step.

9. The invention in accordance with claim 8 wherein I$_2$ is separated from said dry phase and the remaining HI is catalytically decomposed in the liquid phase in the presence of HBr.

10. The invention in accordance with claim 8 wherein said wet phase is subjected to high-pressure distillation to distill HBr and leave an azeotrope of water and not more than about 8 mole percent HBr.

11. The invention in accordance with claim 10 wherein said azeotrope is returned to said main reaction step and at least some of said returned HBr is thereafter included in said first phase.

12. The invention in accordance with claim 11 wherein the remainder of said returned HBr is carried over in said second liquid phase from said main reaction step along with H$_2$SO$_4$ and H$_2$O and wherein this HBr is fractionally distilled from said second phase by treating said second liquid phase with sufficient additional concentrated H$_2$SO$_4$ to break the H$_2$O—HBr azeotrope.

13. The invention in accordance with claim 11 wherein the remainder of said returned HBr is carried over in said second liquid phase and is extracted therefrom by contact with a countercurrently flowing I$_2$ stream in a step that also serves to increase the H$_2$SO$_4$ concentration of said second liquid phase.

* * * * *